INVENTOR.
ARCH C. LUTHER, JR.
BY
[signature]
ATTORNEY

March 25, 1958 A. C. LUTHER, JR 2,828,355

COLOR TELEVISION MONITORING SYSTEM

Filed Dec. 30, 1954 5 Sheets-Sheet 2

INVENTOR.
ARCH C. LUTHER, JR.
BY
Attorney

INVENTOR.
ARCH C. LUTHER, JR.
BY [signature]
ATTORNEY

March 25, 1958 A. C. LUTHER, JR 2,828,355

COLOR TELEVISION MONITORING SYSTEM

Filed Dec. 30, 1954 5 Sheets-Sheet 4

INVENTOR.
ARCH C. LUTHER, JR.
BY [signature]
ATTORNEY

INVENTOR.
ARCH C. LUTHER, JR.
BY
ATTORNEY

United States Patent Office 2,828,355

Patented Mar. 25, 1958

2,828,355

COLOR TELEVISION MONITORING SYSTEM

Arch C. Luther, Jr., Merchantville, N. J., assignor to Radio Corporation of America, a corporation of Delaware Application December 30, 1954, Serial No. 478,743

5 Claims. (Cl. 178—5.4)

The invention relates to television broadcasting and it particularly pertains to broadcasting station equipment for monitoring the video-frequency color-component signals being processed for producing a color television program.

All broadcasting systems require monitoring of the signals at various levels in the development before the signals are radiated by the transmitting antenna. The broadcasting of amplitude modulated or frequency modulated radio wave signals demands only relatively simple monitoring operations. Somewhat more complex operations are required for monitoring monochrome or black and white television broadcasting signals. Color television broadcasting demands much more complex monitoring operations because of the multiplicity of component signals involved and the more stringent requirements laid down by the Federal Communications Commission for color television broadcasting.

An object of the invention is to provide a color television monitoring system requiring relatively little manual operation on the part of the television broadcast station operation engineer.

Another object of the invention is to provide color television monitoring equipment of simple improved construction and high stability of operation.

A further object of the invention is to provide a color television monitoring system which affords a direct comparison of the signals of the three component colors at a glance.

A more specific object of the invention is to provide an electronic calibrating potential for an oscilloscope display of electric wave signals in order to eliminate parallax errors.

Still another object of the invention is to incorporate test signal switching circuitry into electric wave signal monitoring equipment to place the equipment in readiness for television signal broadcasting in the minimum amount of time.

According to the invention a conventional television broadcast station monitor cathode ray oscilloscope having the usual linear horizontal sweep derived from a sawtooth wave generating circuit is modified by adding terminals connected to the generating circuit to superimpose a low frequency step wave on the sawtooth wave to split the display into a plurality of smaller displays side-by-side. The step wave is derived from circuitry located in complementary signal monitoring apparatus according to the invention. This monitoring apparatus comprises a switching device arranged simultaneously to apply component color signals obtained from a number of points in the complementary color television signal translating system to be monitored selectively to the plurality of input terminals of an electronic commutator circuit to derive a serially arranged signal at common output terminals of the electronic commutator circuit in synchronism with the operation of a step wave generating and frequency dividing circuit coupled to the electronic commutator circuit. The step wave generating and frequency dividing circuit is arranged to produce a low frequency step wave potential from an applied higher frequency vertical synchronizing pulse wave obtained from the synchronizing pulse generating apparatus of the color television broadcast station. The step wave is applied to the monitor oscilloscope and simultaneously to the electronic commutator circuit clipping tubes in the electronic commutator circuit to bias the gating tubes in such manner that the gating tubes conduct in succession and only one gating tube is conducting at any given instant. A blanking circuit, preferably forming a part of a more or less conventional clamping and blanking amplifier, is connected between the common terminals of the electronic commutator circuit and the signal input amplifier terminals of the monitor oscilloscope by way of another switching device arranged to apply the serially combined component signal or test and calibrating signals selectively to the monitor oscilloscope. Thus the signal monitoring equipment comprising the monitoring apparatus according to the invention and the monitor oscilloscope may first be adjusted and calibrated and then switched to observe the display of the component color signals simultaneously side-by-side on the screen of the cathode ray oscilloscope. The monitoring equipment according to the invention is also arranged so that a calibrating line generating pulse may be added to the serially combined component signal wave at the input of the oscilloscope to present a signal reference level lines across the cathode ray oscilloscope display, thereby eliminating parallax which would be inherent with external reticules and the like.

In order tho the invention may be more clearly understood and readily put to practice, a specific embodiment, given by way of example only, is described with reference to the accompanying drawing in which:

Fig. 1 is a functional diagram of portions of a color television broadcasting system incorporating monitoring equipment comprising a monitor oscilloscope and monitoring apparatus according to the invention;

Fig. 2 (sections *a*, *b* and *c* being taken together) is a schematic diagram of an example of color television signal monitoring apparatus outlined in Fig. 1;

Figure 1:
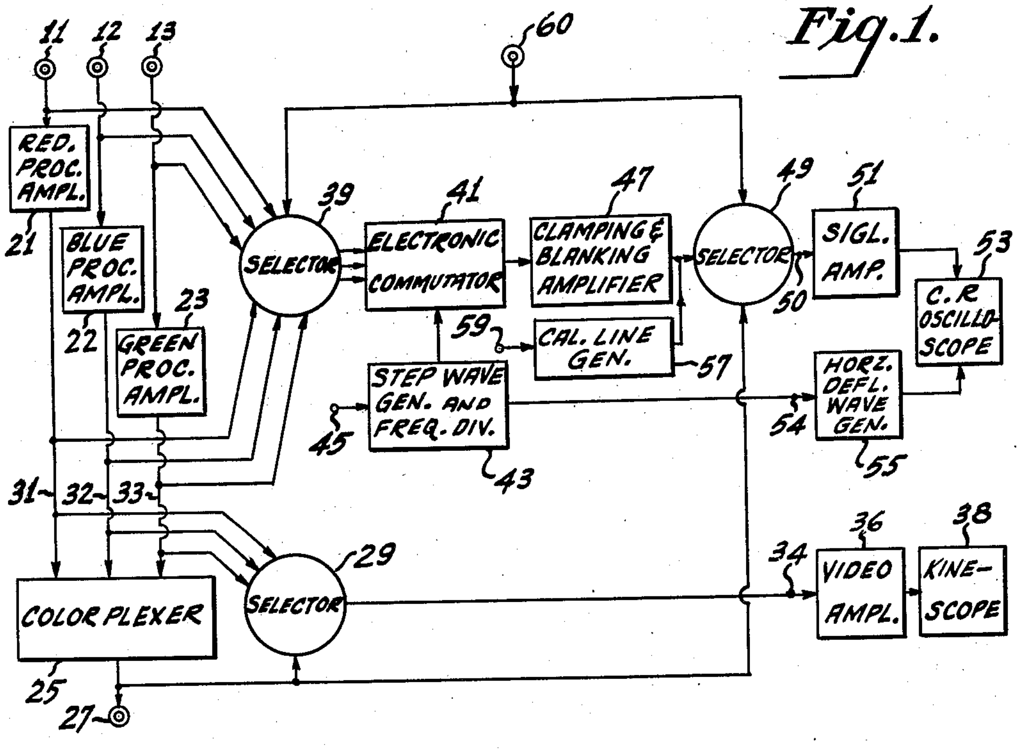

A functional diagram of a complementary signal translating system in the form of a color television broadcasting system incorporating monitoring circuitry according to the invention is shown in Fig. 1 wherein the component color signals from a color television camera or other signal pickup devices are presented at the input terminals 11, 12, 13 of a plurality of processing amplifiers 21, 22 and 23, there being one such processing amplifier for each of the plurality of component signals. These processing amplifiers are arranged so that the television broadcast station operating engineer is able to control the addition of blanking signals, vary the degree of pedestal setup, adjust the gain of each component signal level, add shading potentials, and otherwise process the signals as required. After the signal components have been processed they are applied to the input terminals of a colorplexer 25 or other signal combining circuits where the signals are combined or modified in the manner required by the type of color television signal transmission for which the television signal broadcasting system under consideration is established. It should be understood that the operation of the colorplexer is in no way a part of the invention.

and that the circuitry according to the invention is useful with many different types of colorplexers. The combined color signals from the colorplexer are available at the colorplexer output terminals 27 at which point the combined signals have been clamped, blanked and otherwise put in the proper form for application to the television visual signal broadcasting transmitter (not shown).

In order that the broadcast station operating engineer can make the necessary operations or adjustments to the processing amplifiers, there must be some means of monitoring these signals at one or more points in the system. According to the invention the output of the colorplexer 25 at the output terminals 27 may be applied through a switching device 29 to terminals 34 leading to the input amplifier 36 of a monitor kinescope 38. The switching device 29 is also arranged to apply one or more color component signals as appear on the leads 31, 32 and 33 from the output circuits of the processing amplifiers 21, 22 and 23 to the input amplifier 36 and the monitor kinescope 38. Thus the operator can view on the monitor kinescope 33 an image comprising only the red, or blue, or green components of an image comprising red and green components only, or blue and green components only, or all three components at the input to the colorplexer, or the image as it appears at the output of the colorplexer.

Figure 4:
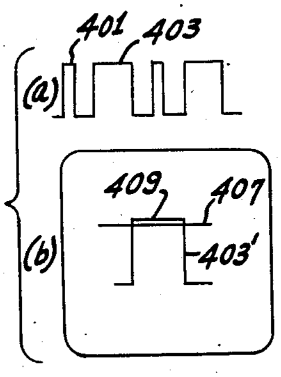
Fig. 4 is a graphical representation of calibrating waveforms compared with the appearance thereof on the fluorescent screen of a cathode ray oscillograph.
Figure 3:
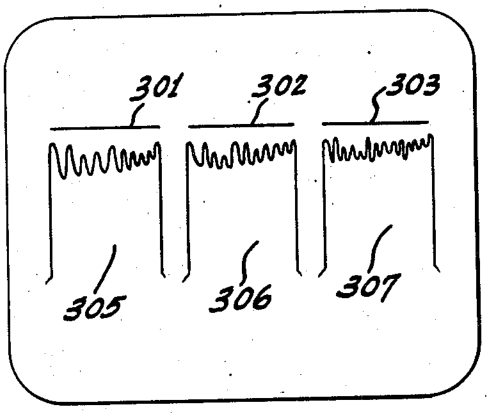
Fig. 3 is a graphical representation of waveforms appearing at various points in the circuit arrangement of Fig. 2.

More exact information is necessary for setting the controls on the processing amplifiers and therefore means are provided for comparing the relative amplitudes of the color component signals from the color camera. A switching device 39 is arranged to present the color component signals appearing at the terminals 11—13 to an electronic commutator 41. The commutator 41 is arranged to operate at a submultiple of the field deflection rate of the number of component signals in order to present a substantially stationary pattern on the cathode ray oscilloscope. Preferably, according to the invention the commutator 41 is driven at ⅓ of the vertical deflection rate by means of a step wave generating the frequency dividing circuit 43 in response to vertical drive pulses applied at the vertical drive pulse input terminals 45. The output of the electronic commutator comprises serially appearing samples of each of the color components which are applied to a clamping and blanking amplifier circuit 47. The clamping and blanking amplifier is arranged to eliminate switching transients that may be generated by the electronic commutator 41 and also to provide the usual clamping and blanking necessary for application to the conventional monochrome television monitor oscilloscope. The output of the clamping and blanking amplifier 47 is applied by way of another switching device 49 to terminals 50 leading to a signal amplifying circuit 51 for presentation to the vertical plates of a cathode ray oscilloscope 53. A 20 cycle per second step wave derived from the step wave generating circuit 43 is applied by way of terminals 54 leading to the horizontal deflection generating circuit 55. The horizontal deflection wave generating circuit 55 is arranged to generate a sawtooth wave at line frequency recurrence rate or, if desired, at field frequency recurrence rate, which is stepped by superposition of the 20 cycle step wave obtained from the step wave generating circuit 43, so that the three component signals are displayed side-by-side on the cathode ray oscilloscope 53 as indicated in Fig. 3. The switching devices are arranged to utilize a calibrating square wave signal which is normally available at all camera control positions in a television broadcasting station to calibrate the monitoring equipment. An electronic calibration lines, as shown in Fig. 4, may be introduced on the display of the cathode ray oscilloscope 53 by means of a calibrating line generating circuit 47 which is operative in response to applied train of horizontal synchronizing pulses applied to the horizontal drive input terminals 59. The switching devices are arranged for checking the accuracy of the calibrating line and the output of the calibrating line generating circuit 57 is adjustable so that the calibrating line can be adjusted to coincide with the amplitude of the 15.75 kc. square wave calibrating signal applied at the calibrating wave input terminals 60. Also the switching device 39 is arranged to display the output of the processing amplifiers 21, 22, 23 or the input to the colorplexer 25 side-by-side on the cathode ray oscilloscope 53 and the switching device 49 is arranged to select the output of the colorplexer 25 for display on the cathode ray oscilloscope 53 if desired.

The processing amplifiers 21, 22 and 23 and the colorplexer 25 are normal component parts of the television broadcasting station. The switching device 29, the video frequency monitor amplifier 36, and the monitor kinescope 38 may be more or less conventional. Preferably, for the convenience of the operating engineer, the switching device 29 is arranged in or near the monitoring apparatus according to the invention to apply the electric wave signals to be monitored to the circuits of a known monochrome television signal monitor kinescope at the terminals 34. The switching device 39, the electronic commutator 41, the step wave generating and frequency dividing circuit 43, the clamping and blanking amplifier 47, the switching device 49 and the calibration line generating circuit 57 constitute the circuitry of the monitoring apparatus according to the invention for feeding the component color signals to the signal input amplifier 51 at the terminal 50 and the step wave to the horizontal deflection generating circuit 55 at the terminal 54 for application to the cathode ray oscilloscope 53, which circuits are preferably conventional arrangements in the known monochrome television monitor containing the amplifier 36 and the kinescope 38. According to one practical embodiment incorporating the invention to be described hereinafter, the only modification to existing monochrome television monitor required for operation with the circuitry according to the invention is the addition of the terminals 54 wired into the circuit in order to superimpose the step wave on the horizontal deflection wave generator internally of the monochrome monitor apparatus. Further in the interests of economy and standardization, it is contemplated that the clamping and blanking amplifier 47 shall be identical to the processing amplifiers 21, 22 and 23, although it is to be understood that an especially designed circuit arrangement may be used if desired.

Figure 2A:
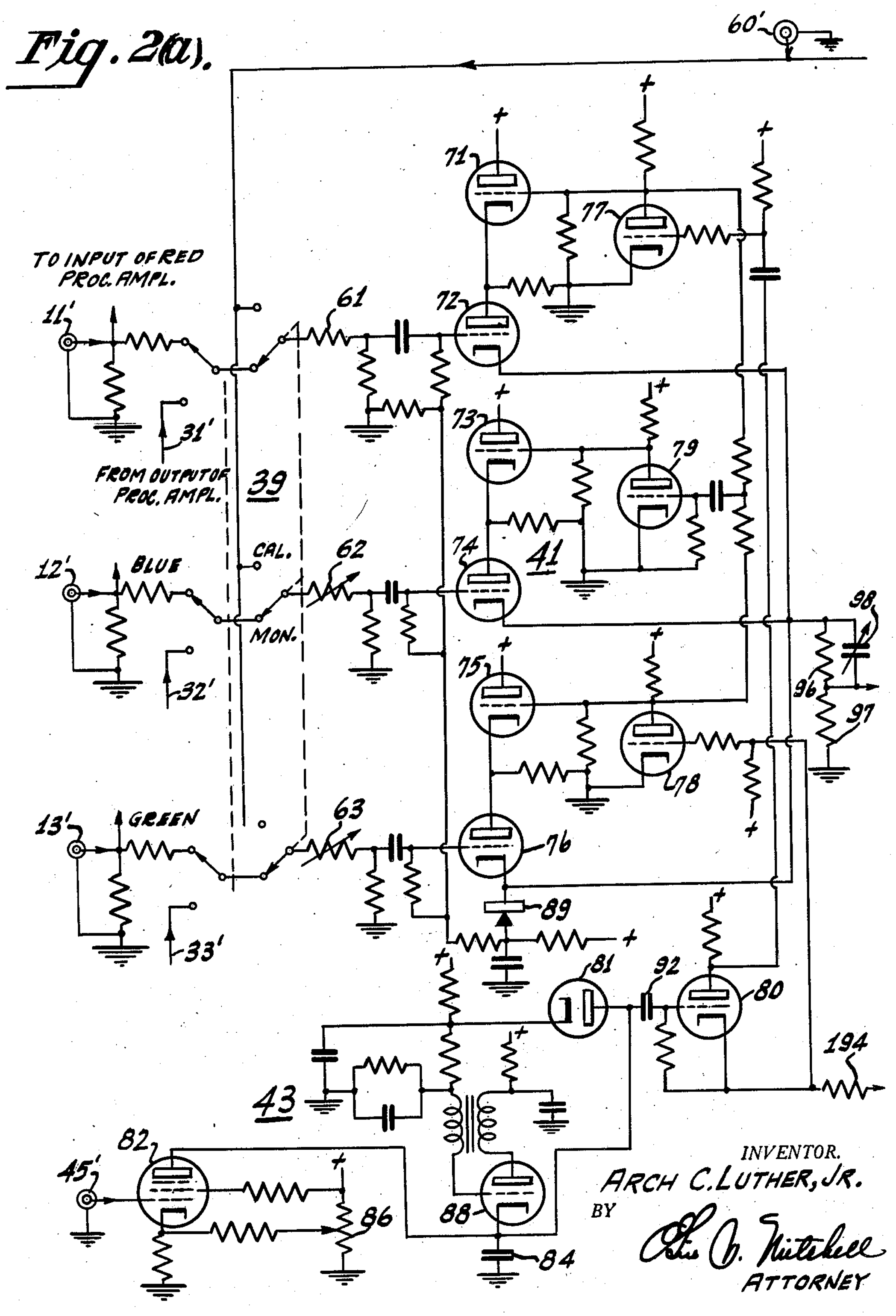
Figure 2B:
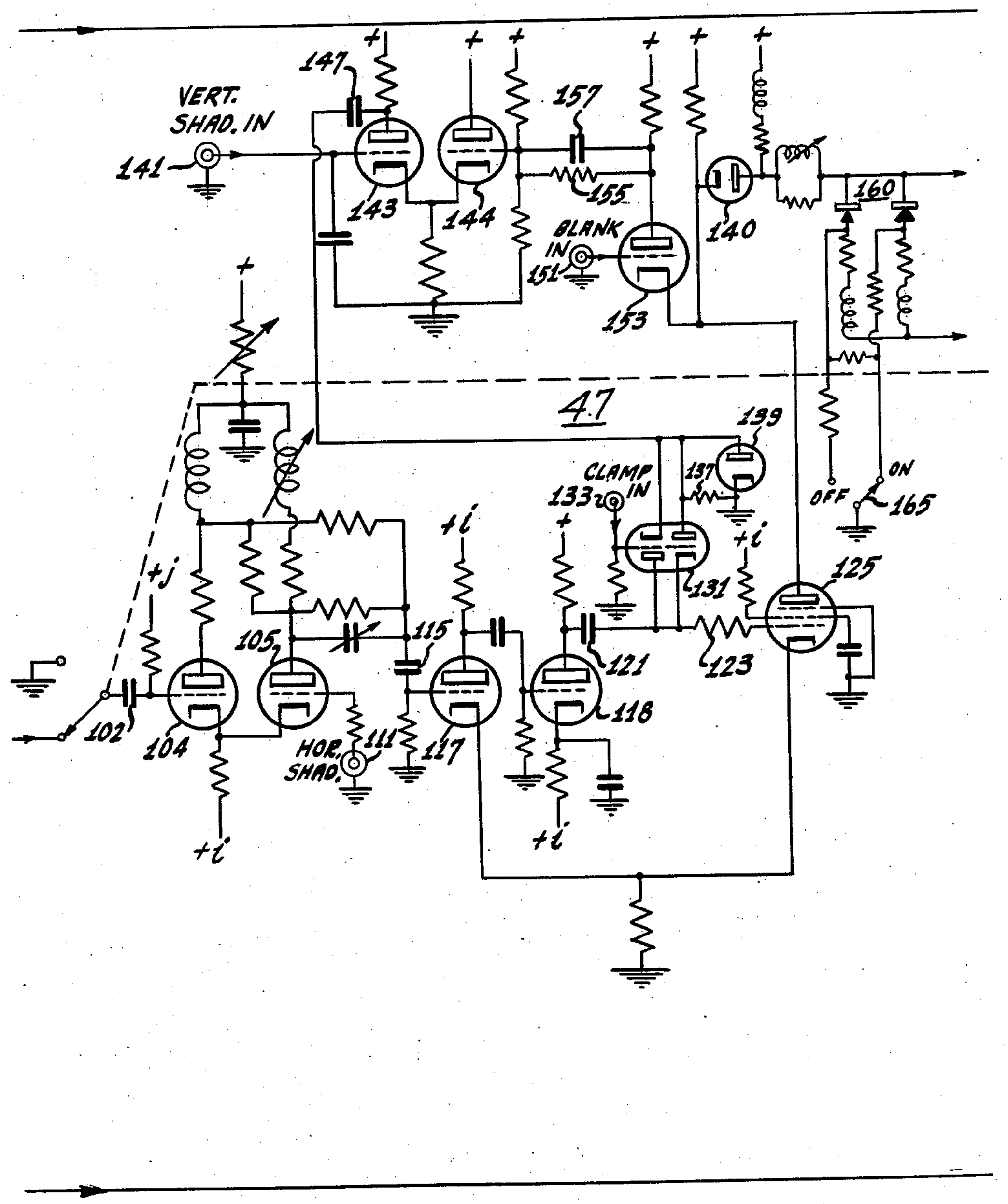
Figure 2C:
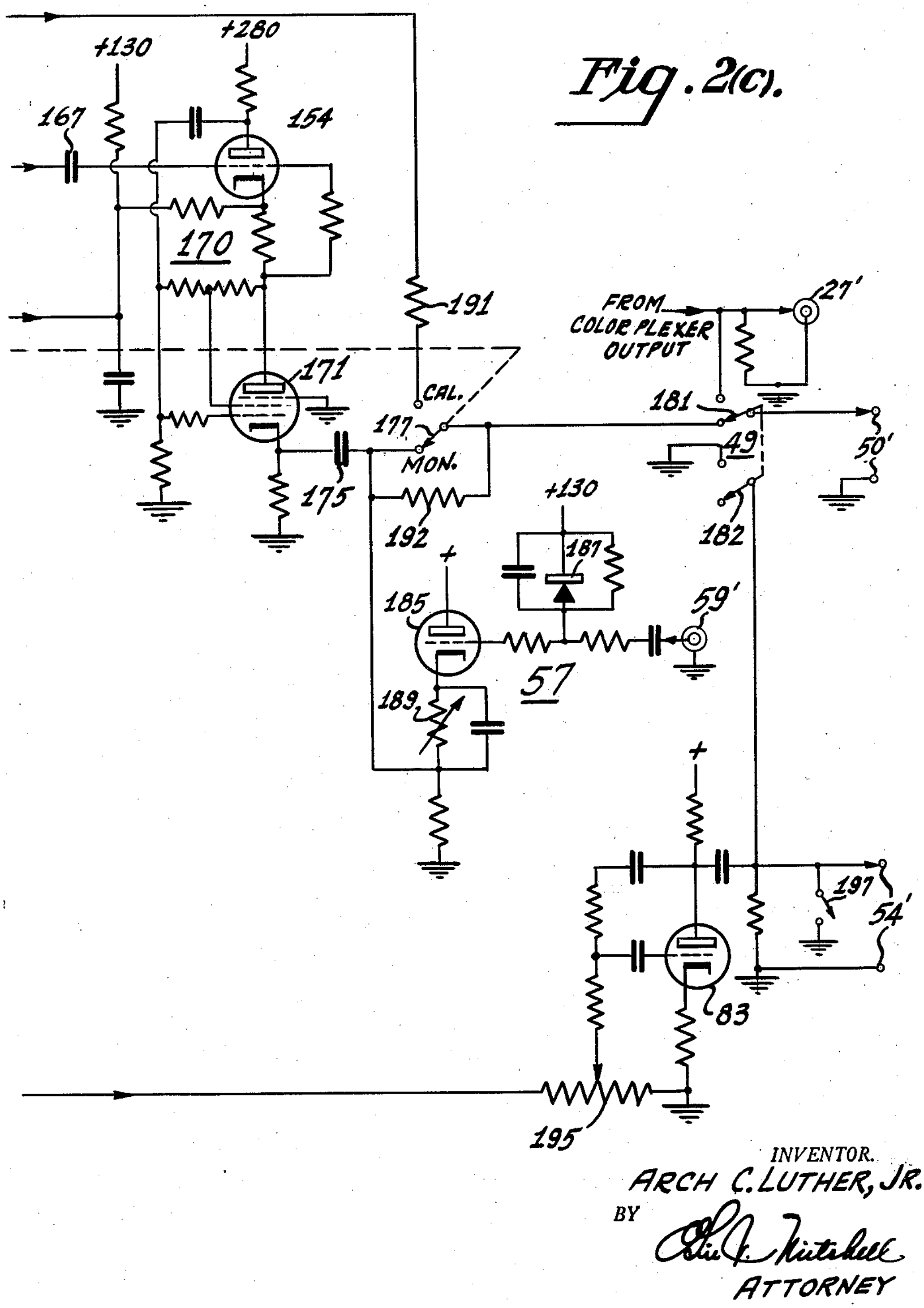

A schematic diagram of an example of circuitry for performing the functions providing the desired cathode ray oscilloscope display as outlined by the diagram of Fig. 1 is shown in Fig. 2 comprising three sections, 2(*a*), 2(*b*) and 2(*c*). The switching device 39 is shown here as a pair of three-pole double-throw switches, one of which is arranged to select the electric signal waves to be monitored from either the inputs to the processing amplifiers 21—23 at the respective input terminals 11′—13′ or the output signal waves from these processing amplifiers at the leads 31′—33′ and the other of which is arranged to select either the electric wave signals as selected by the one switch or a calibrating square wave as available at the calibrating square wave input terminals 60′. In practice it is preferred that multiple-gauged push-button switch assemblies be used because of the inherent ease of operation, but it should be understood that any switching device capable of performing the functions of the example given may be used as desired. The output terminals of the switching device 39 are coupled by means of resistors 61, 62 and 63 to the input terminals of the electronic commutator 41. The electronic commutator 41 is constituted by three gating tube circuits comprising six vacuum tubes 71–76 together with four clipping vacuum tubes 77–80. Vertical synchronizing pulses applied at the vertical drive pulse input terminals 45′ are applied to a counting tube 82 which is operative to store a charge in the charge storing capacitor 84 connected to the anode of the tube 82. The amount of charge stored at each drive pulse is regulated by means of a variably tapped resistor 86 in a cathode circuit of the charging tube 82. The accumulated charge on the charge storing capacitor 84 determines the triggering time of an oscillator tube 88 connected in blocking oscillator circuitry to discharge the charge storing capacitor 84. By means of this circuitry a potential of step wave form is produced across the charge storing capacitor 84. In the circuit arrangement shown the step wave produced has a recurrence frequency of 20 cycles per second in response to a train of pulses of 60 cycles per second pulse recurrence frequency applied at the input terminals 45' and the resistor 86 is set so that the counting portion counts by a factor of three to generate a step wave having three discrete step levels. For other applications where an electronic commutator of more than three "segments" is desired the arm of the variable resistor 86 would be set to provide a different counting factor as required and at the same time provide a step wave having a different number of discrete levels or steps. The step wave appearing across the charge storing capacitor 84 is applied by way of a coupling capacitor 92 to the grid of the phase-splitting tube 80. A diode 81 is provided for clipping the upper limit of the step wave to stabilize the operation of the oscillator tube 88. The anode of the phase-splitting tube 80 is coupled to the grid of one of the clipping tubes 77 and the cathode of the phase-splitting tube 80 is coupled to a grid of another of the clipping tubes 78, while the grid of the remaining clipping tube 79 is coupled to the anodes of other clipping tubes 77, 78. The clipping tubes 77—79 apply the permutations of the resultant gating central waves to the grids of the tubes 71, 73, 75 in the anode leads of the gating tubes 72, 74, 76 to render the latter conducting variations of the anode resistance due to change in conduction of the gating central tubes 71, 73 and 75. These connections and the operating potentials on the tubes are arranged so that the gating tubes 72, 74 and 76 conduct in succession one at a time with a small spacing between each period of conduction, to produce an output signal of serially arranged samples across a common output resistance element 96, 97 connected to the cathodes of the gating tubes 72, 74 and 76.

Between the intervals during which tubes 72, 74 and 76 are conducting, the cathode voltage of these tubes tends to drop. A semiconductor diode 89 is connected to the cathodes to prevent any such abnormal drop of cathode voltage which might cause grid current to flow in any one of the tubes 72, 74 or 76 and thus introduce a disturbance in the input circuit of these tubes which would appear on the signal line being monitored.

A variable capacitor 98 shunting the resistance element 96 is provided to compensate for loss due to frequency discrimination at the higher frequencies. The output wave across the resistance element 97 consists of 1/60-second samples or red, blue and green video wave signal components in sequence. The necessary 20 cycle per second low frequency switching potentials may be developed by any form of frequency divider known to the art, however, it should be immediately recognized that the circuit arrangement according to the invention of Fig. 2 has a great advantage in utilizing the step wave type counter as a frequency divider and as a step wave generator for driving the cathode ray oscilloscope at one and the same time.

The signal appearing across the output resistance element 97 will contain switching transients generated by the electronic commutator 41. While known measures for removing such transients may be employed, it is preferred in the circuit according to the invention to utilize a clamping and blanking amplifier 47 which is either identical to or of the same type as the signal processing amplifiers 21—23 as the output signal will normally require such processing before presentation to the known type of monitor cathode ray oscilloscope. Hence the necessary amplification and other processing is accomplished by the same circuit and it is a well known economic observation that it is less expensive to use a fourth amplifier identical with the component color processing amplifiers than it is to design a special amplifier to perform only a few of the functions.

The output signal wave appearing across the output resistance element 97 is supplied by way of a coupling capacitor 102 shown in Fig. 2(*b*) to the grid of a cathode coupled video frequency amplifier circuit comprising two vacuum tubes 104, 105. Variable resistance, variable inductance and variable capacitance is provided for in the anode circuits of the input amplifier tubes 104, 105 to compensate for the deleterious effects of transmitting the signals over coaxial cables and like circuits. While these effects are not at all serious in the circuit arrangement shown, the compensating circuitry does not work to any disadvantage and need not be removed. Horizontal shading potentials may be applied to the input terminals 111 connected to the grid of the input amplifier tube 105. The multiplexed color component signal wave, which now may have horizontal shading components, is applied by means of a coupling capacitor 115 to a grid of a further amplifier tube 117 which is coupled to still another amplifier tube 118. The output of the amplifier tube 118 is applied by means of a coupling capacitor 121 and a series resistor 123 to the grid of a power amplifier tube 125. Grid of the power amplifier tube 125 is clamped during the clamping interval by means of a circuit comprising a bilateral conducting electron discharge device 131 which is rendered conducting in response to a clamping pulse wave applied to the clamping input terminals 133 which drives the grid element 135 positive causing the device to conduct bringing the grid of the power amplifier 125 to ground through a resistor 137. The resistor 137 is shunted by a diode 139 which conducts for all positive pulses that may appear at the anode thereof. Any other known clamping arrangement may be used instead of the one shown, if desired, since the operation of the monitoring equipment according to the invention is not limited in this respect. Vertical shading potentials applied at vertical shading input terminals 141 are applied to the grid of a shading tube 143 which is cathode coupled to another tube 144. The anode of the vertical shading tube 143 is connected by means of a coupling capacitor 147 to the anode of the diode 139. A train of blanking pulses is applied at blanking input terminals 151 connected to the grid of a blanking inserter tube 153 having the anode coupled by means of a resistor 155 and a capacitor 157 to the grid of the cathode coupled tube 144. The cathode of the blanking inserter tube 153 is connected to the anode of the power amplifier tube 125 to which the cathode of a linear clipping diode 140 is also connected. The anode of the linear clipping tube 140 is connected to a gamma correcting network 160 comprising semi-conducting diodes, resistors and inductors and arranged to be rendered effective or ineffective at the manipulation of a simple selector switch 165. The gamma correcting network may be omitted entirely, if desired, or alternately any other known gamma correcting circuit can be used. From the gamma correction network 160, this signal is applied by way of a coupling capacitor 167 shown in Fig. 2(*c*) to the input circuit of a power amplifier stage 170 comprising a triode vacuum tube 154 and a power pentode tube 171 connected in a feedback output circuit of known configuration.

The output signal, blanked and clamped ready for application to the cathode ray oscilloscope, is obtained from the cathode of the amplifier 171 by means of a coupling capacitor 175 leading to one section 177 of a calibrate-monitor selector switch and one section 181 of the output switching device 49 which is connected to the input terminals 50' of the cathode ray oscilloscope input signal amplifier (not shown). The vertical deflection of the monitor cathode ray oscilloscope (not shown in Fig.

2) is calibrated by means of the calibrating square wave applied at the calibrating square wave input terminals 60′ by throwing the calibrate-monitor switch 177 to the calibrate position at which time the switch 178 disconnects the video signal from the input of the clamping and blanking amplifier 47.

The oscilloscope of the monitor may have a calibrated reticule in front of the fluorescent screen, but in order to eliminate parallax errors in calibrating and using the oscilloscope inherent with such mechanical devices, an electronic calibration line is introduced into the signal applied to the signal amplifier of the monitor at the terminals 50. This calibrating line signal is developed in a vacuum tube 185 to the grid of which horizontal synchronizing pulses at a repetition rate of 15.75 kc., which are available in the television broadcast station, are applied at the horizontal drive pulse input terminals 59′. A semi-conductor diode element 187 is used to stabilize the positive peak level of the horizontal drive pulses. The calibrating line pulses as developed in the calibration line generating tube 185 are obtained from the cathode electrode and applied to one terminal of the calibrate-monitor switch section 177. The amplitude of these calibrating pulses is adjusted by means of a variable resistance element 189 in the cathode lead of the calibration line generating tube 185. The calibration is checked by throwing the switch section 177 to the "calibrate" position to mix the calibrating square wave at the terminals 60′ with the calibrating line pulses from the generating tube 185 in the two resistors 191, 192. The signal then applied at the terminals 50′ to the cathode ray oscilloscope of the monitor will be as shown in Fig. 4(*a*) comprising a train of calibrating line pulses 401 derived from the calibrating line generating tube 185 interspersed with a train of wider pulses 403 obtained from the calibrating square wave source at the terminal 60′. On the face of the cathode ray oscilloscope the calibrating square wave pulse train will appear as a stationary pulse 403′ as shown in Fig. 4(*b*) the trace of the calibrating line pulses 401 will be sweeping across the face of the cathode ray oscilloscope and only the tips of the calibrating line pulses 401 will produce a distinct trace on the oscilloscope forming the line 407. The tip of the calibrating sqaure wave pulse 403 forms the line 409. By adjustment of the resistor 189, the amplitude of the calibrating line pulses 401 can be made to coincide with the tip 409 of the calibrating square wave pulse 403′. The calibration line produced on the cathode ray oscilloscope by means of a calibrating line generating circuit 57 will now be of the same level as that of the reference square wave calibrating signal which is standard for the broadcasting station under consideration.

Thereafter the calibrate-monitor switch sections 177, 178 are switched to the monitor position and the switching device 39 is switched to apply the standard square wave input at the terminal input 60′ to the electronic commutator 41 and the clamping and blanking amplifier 47. The gain of the blanking amplifier 47 is set by adjustment of the D.-C. voltage to the grids of tubes 104 and 105 (Fig. 2(*b*)) and the balance of the electronic commutator 41 is set by adjusting the variable resistors 62, 63 in the input circuits of the gating tubes 74, 76 so that the signals passing through the clamping and blanking amplifier coincide with the calibrating line on the cathode ray oscilloscope. The monitor circuits are now completely calibrated for normal operation on red, blue and green video color component signals.

The 20 C. P. S. step wave obtained at the cathode of the phase-splitting tube 80 shown in Fig. 2(*a*) is developed across a pair of resistors 197, 195, the latter of which is variably tapped for applying the step wave to the grid of the step wave amplifying tube 83 and varying the width of the step wave applied to the cathode ray oscilloscope. The step wave amplifying tube 83 has degenerative connections for assuring delivery of a well shaped stepped wave to the deflection circuit input terminals 54 of the cathode ray oscilloscope horizontal deflection wave generating circuit (55 of Fig. 1—not shown in Fig. 2).

It is further necessary in a color television broadcasting station to be able to view the output of the colorplexer 25 on the monitor oscilloscope 53. The output signal from the colorplexer is bypassed around the switching and blanking circuitry in the monitoring equipment according to the invention to avoid the stringent requirements for handling the output signal of the colorplexer. Therefore the lead from the colorplexer output terminal 27′ is brought to a contact on the switch section 181 of the switching device 49 to apply the output of the colorplexer signal to the input terminals 50 of the signal amplifier (51 in Fig. 1) of the cathode ray oscilloscope (53 in Fig. 1—not shown in Fig. 2). At the same time the output of the step wave amplifying tube 83 is grounded through the switch section 182 of the switching device 49 so that the step wave is no longer superimposed on the horizontal deflection wave generating circuit in the cathode ray monitor oscilloscope. In addition, the horizontal sweep generator of the cathode ray oscilloscope is switched back to 7875 C. P. S. or 30 C. P. S. operation so that the normal display of the two cycles of the video waveform is presented.

Since the colorplexer is switched into the circuit arrangement according to the invention at the same point where the local calibration signal from the calibrating line signal generating tube 185 is added to the other displays, it is possible to set the oscilloscope gain so that the calibrating line corresponds to a certain displacement of the cathode ray oscilloscope electron beam. Then at the time the colorplexer output is being observed this same displacement will represent the same known level.

The horizontal sweep on the cathode ray oscilloscope is formed by the addition of two wave forms, namely the low frequency step wave form and the sawtooth wave generated in the monitor cathode ray oscilloscope horizontal sweep generating circuit. The addition of these two wave forms serves to split the display into three separate displays appearing side-by-side as shown in Fig. 3. By throwing the superposition switch 197, the output of the step wave amplifying tube 83 is grounded and the three separate color component signals will be traced one on top of the other for more direct comparison.

Figure 5:
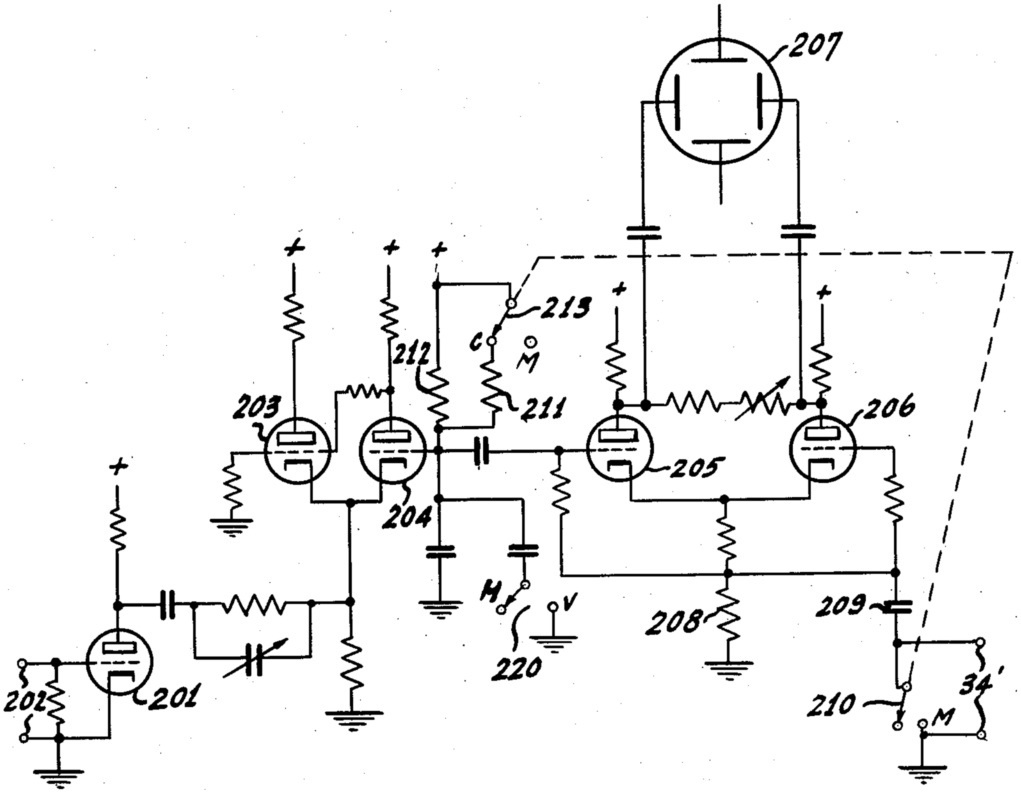
Fig. 5 is a schematic diagram showing an example of the simple changes to a monochrome television signal monitor oscilloscope to adapt it for operation according to the invention.

While the conversion of any monochrome television monitor oscilloscope is well within the skill of the artisan, the changes necessary to convert the well-known RCA TM—6A monochrome television monitor oscilloscope for color television monitoring are illustrated in Fig. 5 to show the simplicity thereof. The horizontal deflection circuit of the monitor comprises a horizontal synchronizing pulse amplifier tube 201 to which horizontal synchronizing pulses from the synchronizing separator circuit are applied at the terminals 202. The amplified pulse is delivered to a sawtooth generator circuit comprising two tubes 203, 204 and the resulting sawtooth wave is applied to the push-pull horizontal output amplifier tubes 205, 206 for application to the horizontal plates of the cathode ray tube 207. The horizontal sawtooth amplifier tubes 205, 206 are connected in a cathode coupled differential amplifier circuit. A common cathode resistor 208 is normally bypassed to ground by a capacitor 209. By means of a switch 210 interposed in the ground lead of the bypass capacitor 209, the step wave input terminals 34′ are connected to apply the step wave across the cathode resistor 208 for color monitoring or the terminals are short circuited for monochrome monitoring as desired. Another switch 220 is arranged to vary the sweep capacity so that sweep will be at half the horizontal or half the vertical scanning rate. If the monitor oscilloscope is arranged to sweep selectively at either half of the horizontal scanning frequency, or at half of the vertical scanning frequency as is the TM–6A and most other monochrome monitors, it is also necessary to change the time constant of the sawtooth wave generator. This is readily done by switching a resistor 211 in parallel with the existing charging resistor 212 by means of a switch 213 to halve the resistance value. The switch 213 is ganged to the switch 210 to make the changeover simple and prevent any difficulty due to incorrect switching. Of course tapping the resistor 212 at or near the midpoint and shorting out one section will also provide the desired change in resistance.

The values below were used for the listed components for the embodiment of the invention as shown in Fig. 2 which provided fully satisfactory operation in a color television broadcasting station and are suggested as an aid in the practice of the invention.

| Ref. No.: | Tubes and semiconductors type No. |
|---|---|
| 71—76 | 12AU7 |
| 77—80 | 12AT7 |
| 81 | ½ 12AT7 |
| 82—83 | 6U8 |
| 88 | 12AT7 |
| 89 | 1N34A |
| 104—105 | 6BQ7A |
| 117—118 | 6BQ7A |
| 125 | 6CL6 |
| 131 | 12AX7 |
| 139—140 | 6AL5 |
| 143—144 | 6BQ7A |
| 153—154 | 6BQ7A |
| 171 | 6CL6 |
| 185 | ½ 6BQ7A |
| 187 | 1N34A |

*Other Components*

| Ref. No. | Component | Type or Value |
|---|---|---|
| 61 | Fixed grid resistor | 470 ohms. |
| 62, 63 | Variable grid resistor | 1,000 ohms. |
| 86 | Step adjusting resistor | 500 kilohms. |
| 96 | Cathode output resistor | 7,500 ohms. |
| 97 | Common output resistor | 3,600 ohms. |
| 98 | Variable capacitor | 7–45 mf. |
| 189 | Calibrating line adjusting resistor | 100 kilohms. |
| 191 | Calibrating mixing resistors | 1,000 ohms. |
| 194 | Step wave output resistor | 22 kilohms. |
| 195 | Cathode ray oscilloscope width control | 25 kilohms. |

The power supply delivered 280 volts between the points marked with the plus (+) and minus (−) signs with 160 volts at the interjacent points marked (+*j*) and 130 volts at the intermediate point marked (+*i*). Other values will be found useful by those skilled in the art for other applications of the invention.

The invention claimed is:

1. A circuit arrangement for monitoring the component signals in a complementary signal translating system of the type having a source of synchronizing and blanking signals and a plurality of component signal processing amplifiers each having an input circuit to which a component signal is applied and output circuit, a component signal combining circuit having input terminals coupled to the output circuits of said processing amplifiers and an output circuit, and a monitor oscilloscope having a sweep circuit for deflecting the electron beam of a cathode ray oscilloscope in a given direction, said circuit arrangement comprising an electronic commutator circuit having a plurality of input terminals and common output terminals, a wave generating and frequency dividing circuit coupled to said electronic commutator and responsive to applied synchronizing signals for driving said electronic commutator and for modifying the deflection of the electron beam in the cathode ray oscilloscope of said monitor oscilloscope, circuit means having input terminals connected to the common output terminals of said electronic commutator and responsive to said blanking signals to suppress switching transients introduced by said commutator and having output terminals, and switching devices interposed between the terminals at which the signals to be monitored appear and the input terminals of said electronic commutator and between the output terminals of said circuit means and the terminals of said monitor oscilloscope, said switching devices being arranged to apply signals from the input circuits of said processing amplifiers, the output circuits of said processing amplifiers and the output circuit of said component signal combining circuit selectively to said monitor oscilloscope thereby to display selectively the component color signals and the combined color signals side-by-side on the monitor oscilloscope for comparison.

2. Apparatus for monitoring the component color signals in a color television signal translating system of the type having a source of synchronizing and blanking signals, a plurality of color signal processing amplifiers each having an input circuit to which a component color signal is applied and output circuit, a colorplexer having input terminals coupled to the output circuits of said processing amplifiers and an output circuit, a source of standard square wave reference signal and a monitor oscilloscope having a circuit developing a sweep for deflecting the electron beam of a cathode ray tube, said apparatus comprising an electronic commutator circuit having a plurality of input terminals and common output terminals, a step-wave generating and frequency dividing circuit coupled to said electronic commutator and responsive to applied synchronizing signals to produce a potential of step waveform for driving said electronic commutator and for modifying the sweep for deflecting the electron beam in the cathode ray tube of said monitor oscilloscope, a clamping and blanking amplifier having input terminals connected to the common output terminals of said electronic commutator terminals connected to said source of blanking signals, circuitry responsive to said blanking signals to suppress switching transients introduced by said commutator and having output terminals, a calibrating line generator coupled to the output terminals of said clamping and blanking amplifier and responsive to an applied pulse train to produce a train of pulses of uniform amplitude, and switching devices interposed between said terminals at which the signals to be monitored appear and the input terminals of said electronic commutator and between the output terminals of said clamping and blanking amplifier and the terminals of said monitor oscilloscope, said switching devices being arranged to apply signals from the input circuits of said processing amplifiers, the output circuits of said processing amplifiers, the output circuit of said colorplexer, and the source of standard square wave reference signal selectively to said monitor oscilloscope thereby to display selectively the component color signals and the combined color signals side-by-side on the monitor oscilloscope for comparison, with a reference level line associated with each component signal, said switching devices being arranged to render the calibrating line generating circuit ineffective upon selection of signals from the output circuit of said colorplexer.

3. Apparatus for monitoring the component color signals in a color television signal translating system of the type having a source of synchronizing and blanking signals, a plurality of color signal processing amplifiers each having an input circuit to which a component color signal is applied and output circuit, a colorplexer having input terminals coupled to the output circuits of said processing amplifiers and an output circuit, a source of standard reference signal and a monitor oscilloscope having a circuit developing a sweep for deflecting the electron beam of a cathode ray tube, said apparatus comprising an electronic commutator circuit having a plurality of input terminals and common output terminals, a step wave generating and frequency dividing circuit coupled to said electronic commutator and responsive to applied synchronizing signals to produce a potential of step waveform for driving said electronic commutator and for modifying the sweep for deflecting the electron beam in the cathode ray tube of said monitor oscilloscope, a clamping and blanking amplifier having input terminals connected to the common output terminals of said electronic commutator terminals connected to said source of blanking signals, circuitry responsive to said blanking signals to suppress switching transients introduced by said commutator and having output terminals, and switching devices interposed between the terminals at which the signals to be monitored appear and the input terminals of said electronic commutator and between the output terminals of said clamping and blanking amplifier and the terminals of said monitor oscilloscope, said switching devices being arranged to apply signals from the input circuits of said processing amplifiers, the output circuits of said processing amplifiers, the output circuit of said colorplexer and the source of standard reference signal selectively with a reference level line associated with each component signal to said monitor oscilloscope thereby to display selectively the component color signals and the combined color signals side-by-side on the monitor oscilloscope for comparison.

4. Apparatus for monitoring the component color signals in a color television signal translating system of the type having a source of synchronizing and blanking signals, a plurality of color signal processing amplifiers each having an input circuit to which a component color signal is applied and output circuit, a colorplexer having input terminals and an output circuit and a monitor oscilloscope having a circuit developing a sweep for deflecting the electron beam of a cathode ray tube, said apparatus comprising an electronic commutator circuit having common output terminals and a plurality of input terminals, a step-wave generating and frequency dividing circuit coupled to said electronic commutator and responsive to applied synchronizing signals to produce a potential of step waveform for driving said electronic commutator and for modifying the sweep for deflecting the electron beam in the cathode ray tube of said monitor oscilloscope, a clamping and blanking amplifier having input terminals connected to the common output terminals of said electronic commutator terminals connected to said source of blanking signals, circuitry responsive to said blanking signals to suppress switching transients introduced by said commutator and having output terminals, and switching devices interposed between the terminals at which the signals to be monitored appear and the input terminals of said electronic commutator and between the output terminals of said clamping and blanking amplifier and the terminals of said monitor oscilloscope, said switching devices being arranged to apply signals from the input circuits of said processing amplifiers, the output circuits of said processing amplifiers and the output circuit of said colorplexer selectively to said monitor oscilloscope thereby to display selectively the component color signals and the combined color signals side-by-side on the monitor oscilloscope for comparison.

5. A circuit arrangement for monitoring the component color signals in a color television signal translating system of the type having a source of blanking signal, a plurality of color signal processing circuits each having an input circuit to which a component color signal is applied and output circuit, a colorplexer having input terminals coupled to the output circuits of said processing amplifiers and an output circuit and a monitor oscilloscope, said circuit arrangement comprising an electronic commutator circuit having a plurality of input terminals and common output terminals, a frequency dividing circuit coupled to said electronic commutator and responsive to applied synchronizing signals to produce a potential wave for driving said electronic commutator, a blanking circuit having input terminals connected to the common output terminals of said electronic commutator terminals connected to said source of blanking signal, circuitry responsive to said blanking signals to suppress switching transients introduced by said commutator and having output terminals, and switching devices interposed between the terminals at which said signals to be monitored appear and the input terminals of said electronic commutator and between the output terminals of said blanking circuit and the terminals of said monitor oscilloscope, said switching devices being arranged to apply signals from the input terminals of said processing circuits, the output terminals of said processing circuits and the output circuit of said colorplexer selectively to said monitor oscilloscope thereby to display selectively the component color signals and the combined color signals side-by-side on the monitor oscilloscope for comparison.

References Cited in the file of this patent

UNITED STATES PATENTS 2,499,039 Simmon ______________ Feb. 28, 1950

OTHER REFERENCES

Broadcast News, pages 30–31, January-February 1954; published by RCA. (Copy in Div. 16.)